(12) United States Patent
Yamazaki

(10) Patent No.: US 6,285,279 B1
(45) Date of Patent: Sep. 4, 2001

(54) INFORMATION DEVICE

(75) Inventor: Takeshi Yamazaki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/325,342

(22) Filed: Jun. 4, 1999

(30) Foreign Application Priority Data

Jun. 5, 1998 (JP) .................................................. 10-156983

(51) Int. Cl.[7] ........................................................ B62J 3/00
(52) U.S. Cl. ...................... 340/432; 340/407.1; 340/965; 701/96
(58) Field of Search ..................................... 340/903, 435, 340/441, 466, 432, 936, 965, 407.1, 901; 701/93.96; 180/284; 123/396, 397, 399

(56) References Cited

U.S. PATENT DOCUMENTS

| | | | |
|---|---|---|---|
| 3,961,598 | * 6/1976 | Krieger | 116/114 AE |
| 3,985,195 | 10/1976 | Tixier | 180/106 |
| 4,060,008 | * 11/1977 | Wilkinson | 74/488 |
| 4,628,317 | 12/1986 | Nishikawa et al. | 340/903 |
| 4,848,502 | 7/1989 | Kikuta et al. | 180/179 |
| 5,568,797 | 10/1996 | Landerretche | 123/396 |

FOREIGN PATENT DOCUMENTS

| | | |
|---|---|---|
| 0448756 | 10/1991 | (EP) . |
| 2216600 | 8/1990 | (JP) . |

\* cited by examiner

*Primary Examiner*—Brent A. Swarthout
(74) *Attorney, Agent, or Firm*—Birch, Stewart, Kolasch &Birch LLP.

(57) ABSTRACT

To provide an information device that makes it possible to easily reduce the overall reaction time and makes it difficult to overlook a warning. An information device includes an external force generator for supplying external force to an operator touched by the extremities, the hands or feet, of a driver at the time of operation of the vehicle. A judging member is provided for receiving an external signal and judging traffic conditions. A control member controls the driving of the external force generator based on the judgement result of the judging member.

6 Claims, 3 Drawing Sheets

INFORMATION DEVICE

BACKGROUND OF THE INVENTION

1. Field of the Invention

The present invention relates to an information device for judging traffic conditions and notifying information to a driver.

2. Description of Background Art

Methods have been proposed for determining traffic conditions by detecting another vehicle or a moving body that approaches the driver's vehicle while driving, and informing the driver of the traffic conditions.

For example, Japanese Patent Laid-open publication No. Hei. 2-216600 discloses a method where a receiver is provided in a vehicle for monitoring the traffic during travel, judging that another moving body is within a short distance by receiving a warning transmitted by a transmitter provided in that moving body, transmitting a warning and notifying the driver of the traffic conditions.

The driver hears and acknowledges this warning, judges the traffic conditions, and actuates operating means such as, for example, a throttle grip in the case of a motorcycle, to reduce the speed of the vehicle.

This warning is a not only an audible signal, but may also be a visible signal, such as the illumination of a display lamp.

In such prior art, since from the time a change occurs in traffic conditions until the driver causes an action in response to the change in conditions the driver follows a series of actions such as visibly or audibly perceiving the warning, recognizing it in his brain, judging conditions, sending operating instructions from his brain to his hands or feet, and then actually carrying out the operation. There is a limit to the extent by which a response time can be reduced from recognizing a warning to the actual human operation of the vehicle.

During an urgent situation, response time is preferably shortened, but there is the limitation described above, and it is possible to fail to recognize the warning due to overlooking, misreading, not hearing, or mishearing the warning if the driver becomes flustered when hurrying.

SUMMARY AND OBJECTS OF THE INVENTION

The present invention has been conceived in view of the above points, and the object of the invention is to provide an information device that enables a substantial reduction in overall response time and makes it difficult to fail to recognize a warning.

In order to achieve the above described object, the present invention provides an information device including an external force generating means for supplying an external force to an operating means touched by the extremities, the hands or feet, of a driver at the time of the operation of a vehicle; judging means for receiving an external signal and judging traffic conditions; and control means for controlling the driving of the external force generating means based on the determined results of the judging means.

If an external signal is received and traffic conditions are judged, the external force generating means is driven based on the result of the judgement and the external force is supplied to operating means touched by the hands or feet of the driver for controlling driving devices of a vehicle while the vehicle is travelling. This means that information is conveyed to the hands or feet of the driver from the operating means to be operated not according to the hearing or seeing ability of the driver but according to the traffic conditions. Thus, there is no failure to recognize the warning and it is possible to significantly reduce the overall response time.

The present invention provides an information device wherein the external force generating means supplies external force to a throttle grip of a vehicle with handlebars.

If an external signal is received and an external force is supplied to the throttle grip to be actuated according to traffic conditions, information is conveyed directly to the hands of the driver from the throttle grip to be operated not according to the hearing or seeing ability of the driver but according to traffic conditions. Thus, there is no failure to recognize the warning and it is possible to significantly reduce the overall response time.

The present invention provides an information device wherein the external force generating means comprises at least one of an urging means for supplying an urging force to the throttle grip in a direction to reduce the number of engine revolutions, and excitation means for supplying vibration to the throttle grip.

If an external signal is received, vibration is applied to the throttle grip to be actuated according to traffic conditions, and an urging force is applied in a direction to reduce the number of engine revolutions. Thus, the driver recognizes the vibration or urging force directly acting on his hands, so there is no failure to recognize the warning and it is possible to significantly reduce the overall response time.

The present invention provides an information device wherein the external force generating means supplies external force to an accelerator pedal of a four wheeled vehicle.

If an external signal is received and external force is supplied to the accelerator pedal to be actuated according to traffic conditions, information is conveyed directly to the hands of the driver from the accelerator pedal to be operated not according to the hearing or seeing ability of the driver but according to traffic conditions. Thus, there is no failure to recognize the warning and it is possible to significantly reduce the overall response time.

The present invention provides an information device wherein the external force generating means comprises at least one of urging means for supplying a new urging force to the accelerator pedal in a direction to return to a deceleration side, and excitation means for supplying vibration to the accelerator pedal.

If an external signal is received, vibration is applied to the accelerator to be actuated according to traffic conditions. An urging force is applied in a direction to reduce the number of engine revolutions. Thus, the driver recognizes the vibration or a new urging force directly acting on his feet, so there is no failure to recognize the warning and it is possible to significantly reduce the overall response time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described with reference to FIG. 1 to FIG. 3. This embodiment is an information device applied to a motorcycle.

Figure 1:
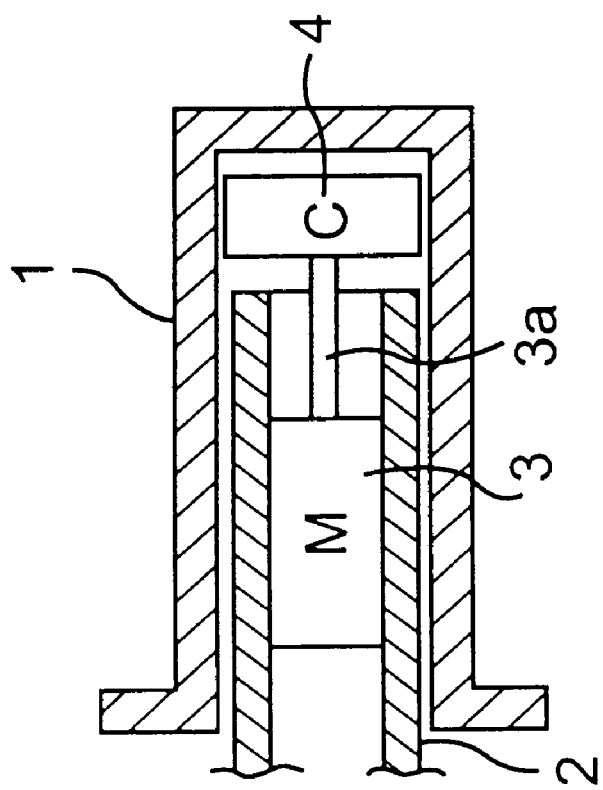
FIG. 1 is a cross sectional drawing of a throttle grip 1 of a motorcycle according to one embodiment of the present invention.

FIG. 1 is a cross-sectional drawing of a throttle grip 1 of a motorcycle. The throttle grip 1 is a closed cylinder and is supported by being rotatably fitted onto the right side end of a cylindrical handle bar 2.

The throttle grip 1 is urged in the direction of reducing the engine speed by a spring (not shown). Acceleration is controlled by a twisting actuation against the force of the spring.

A miniature motor 3 is fitted inside the left end of the handlebar 2, a drive shaft 3a of the motor 3 protrudes from an opening in the right side of the handlebar 2. The end of the drive shaft is attached to a centrifugal clutch 4.

The centrifugal clutch 4 is positioned along the bottom wall of the inside of the throttle grip 1. The motor 3 rotates the drive shaft 3a in the direction in which the throttle grip reduces the speed of the engine. The centrifugal clutch 4 rotates in the same direction as the drive shaft 3a, and expand outwardly so as to come into contact with the inside of the throttle grip 1 and supplies an urging force to the throttle grip 1 in a direction to reduce the engine speed.

The centrifugal clutch 4 is also provided with an eccentric weight so that vibrations are generated due to the rotation of the clutch.

Accordingly, if the motor 3 is driven, an urging force in a direction to reduce the engine speed caused by the centrifugal clutch 4 acts on the throttle grip in addition to the urging force of the spring. A driver holding the throttle grip 1 recognizes this increased urging force and vibrations are conveyed to the driver's hand.

Figure 2:
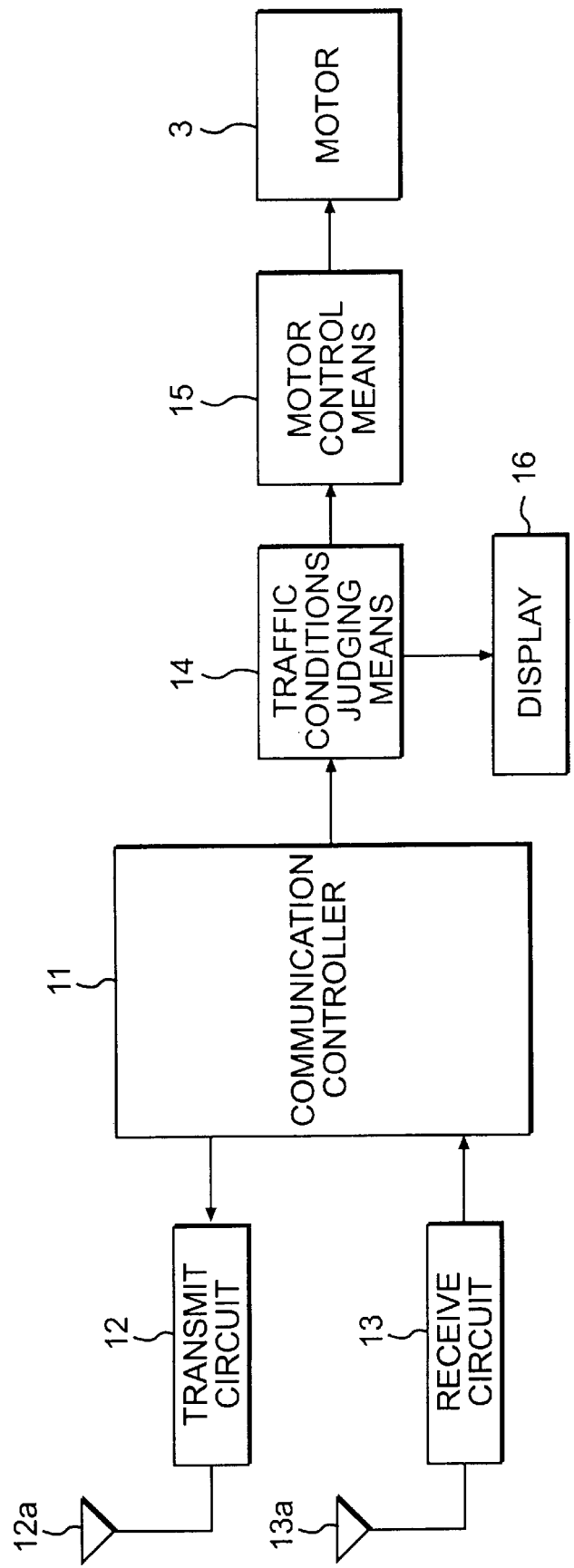
FIG. 2 is a schematic block diagram of a control system for the information device motor drive.

A schematic block diagram of a control system for the information device using the drive of this motor 3 is shown in FIG. 2. A communication control circuit 11 supplies a transmit command to a transmit circuit 12, and is supplied with a receive signal received by a receive circuit 13.

The transmit circuit 12 receives a transmit instruction from the communication control circuit 11 and transmits a signal from the transmit antenna 12a, while the receive circuit 13 receives a signal at the receive antenna 13a and outputs the signal to the communication control circuit 11.

Radio signals are used for communication, but it is also possible to use a light beacon or the like.

A signal that the receive circuit 13 has received from a moving body of another party is processed by the communication control circuit 11, necessary information is output to traffic conditions judging means 14 which analyzes the distance from the moving body of the other part etc., and judges what stage the traffic conditions are at.

Specifically, it is judged whether it is necessary to notify the driver urgently, whether it is not all that urgent, or whether there is no urgency at all.

This judgement result is output to the display 16 and the motor control means 15. The motor control means 15 judges whether or not it is necessary to decelerate, and the drive of the motor 3 of the throttle grip 1 is controlled.

Figure 3:
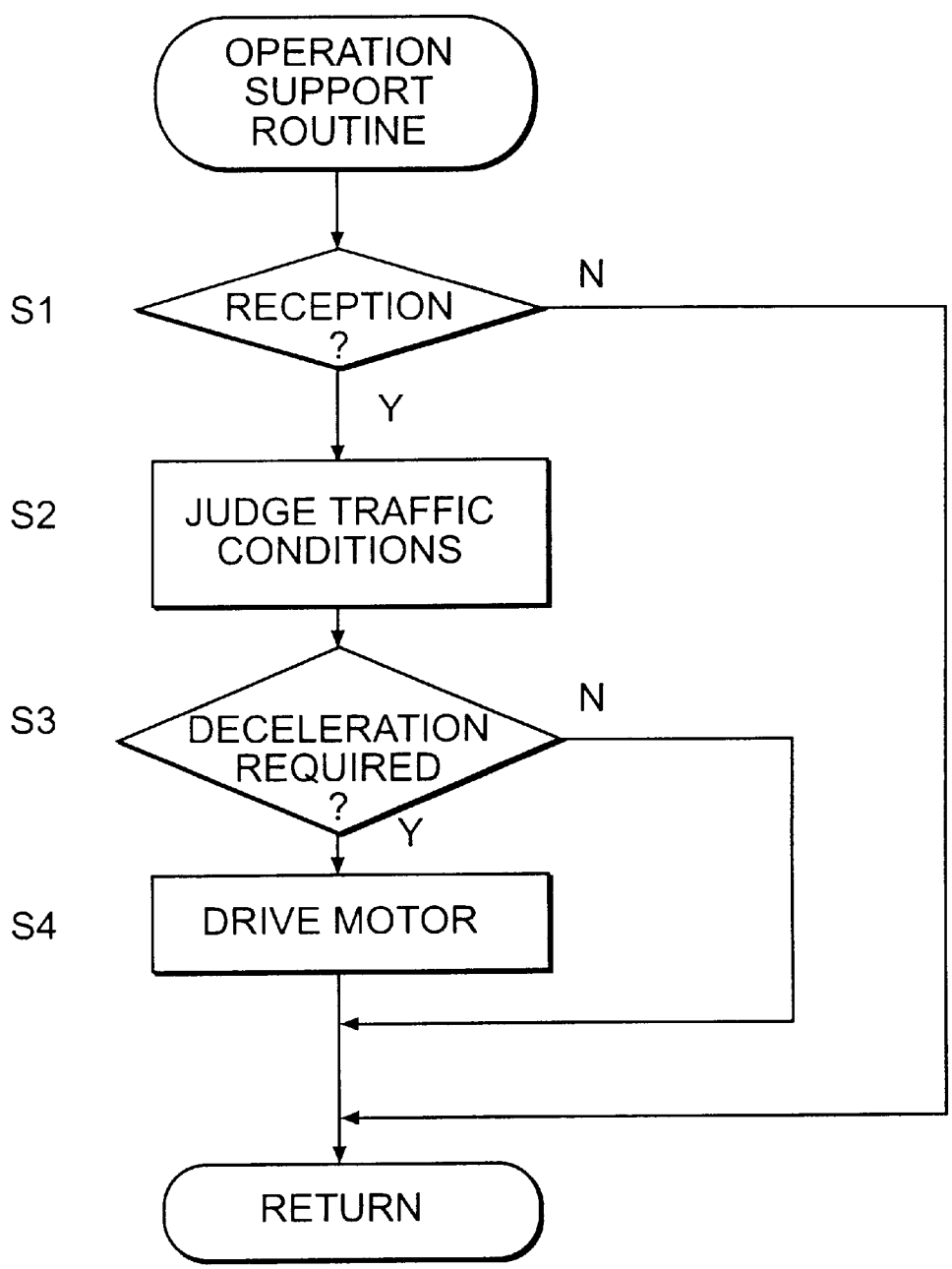
FIG. 3 is a flowchart of the control sequence of the control system shown in FIG. 2.

A schematic diagram of the control sequence of the control system of this invention is shown in FIG. 3 and will now be described. First of all, it is judged whether or not there is a receive signal (step 1), and when there is no receive signal this routine is exited and a return is executed to await a receive signal.

If there is a receive signal, the program advances to step 2, traffic is judged from the received information and it is judged, from a judgement result as to what stage the traffic conditions have reached, whether or not it is necessary to decelerate.

If it is judged that it is necessary to decelerate the program advances to step 4 and the motor 3 is driven, while if it is judged that deceleration is not necessary step 4 is skipped, this routine is exited and the motor 3 is not driven.

By carrying out the control as described above, if the motor 3 is driven by judging from the traffic conditions that deceleration is necessary such as at the time of an emergency or the like, the driver can be made to feel the vibration and a spring force in the direction of deceleration acting on the throttle grip 1 that he is holding, there is no failure to recognize this warning and deceleration is prompted.

Accordingly, the driver feels the warning with his hands caused by the spring force of the throttle grip 1 and the vibration and it is reliably recognized, and it is possible to prevent the failure to recognize the warning.

Also, a deceleration operation carried out by the driver is preferably an operation following the direction in which the spring force acts, and so there is no failure with respect to the judgment or operation.

In order to decelerate, information is conveyed directly to the hands of the driver not from what the driver sees or hears but from the throttle grip 1 that is to be operated.

Since the manual operation is prompted, it is possible to easily reduce the overall reaction time from when the driver recognizes the information until the operation is carried out.

The judgement result from the traffic conditions judging means 14 is also output to the display 16, which means that in situations requiring an urgent display such as providing a flashing display lamp the fact that it is necessary to decelerate is also made visually recognizable.

It is also possible to use an audible alert such as a buzzer.

Here, the motor control means 15 varies the rotational speed of the motor 3 according to the judgement result from the traffic conditions judging means 14.

Specifically, in situations such as where a particular urgency is required, the spring force acting on the throttle grip 1 is increased by rotating at a high speed, while where only a degree of urgency is required the spring force is made a suitable force by rotating at an intermediate speed, and in this way the importance of the information can also be conveyed to the driver.

When there is the utmost need for urgency, it is also possible to cause the throttle grip 1 to forcedly rotate in a returning direction against the driver grasping the throttle grip 1 with the normal force maintaining the rotational angle.

In the above described embodiment, the structure is such that a spring force acts directly on the throttle grip 1, but it is also possible to have such an arrangement that a throttle cable connected to the throttle grip is urged in a direction of throttle closing.

For example, a structure having a clutch attachment disk could be provided on a throttle pulley attached to a carburetor or fuel injection assembly around which the other end of the throttle cable extending from the throttle grip is wound. In this way, a rotation force would be generated by driving the motor.

If the motor is driven and the clutch is controlled to connect in a stepwise manner, the rotational force that controlled the disk causes the throttle cable to be pulled in such a direction that the throttle is closed.

Accordingly, the throttle grip is urged via the throttle cable in a direction to cause deceleration of the vehicle, information is conveyed to the hand of the rider holding the throttle grip, so there is no failure to recognize the information and a manual operation is prompted.

It is also possible to pull the throttle cable in a direction to close the throttle via a spring by using a link acted upon by an electromagnetic force.

Next, in the case of a four wheeled vehicle an air cylinder is attached so as to urge an accelerator pedal in a returning direction, and the air cylinder is connected a compressor via a regulator.

If there is a received signal and it is judged from the traffic conditions that it is necessary to decelerate, the air cylinder is activated, the accelerator pedal is forced in a returning direction, information indicating that there is a need to decelerate is conveyed to the driver's foot that is placed on the accelerator pedal, and deceleration is prompted.

At this time, the regulator is made to operate so that a fixed urging force is applied to the accelerator pedal regardless of the extent to which the throttle is open.

By carrying out this regulator operation in a pulsed manner, the driver can more reliably recognize changes in the pressure applied to the accelerator pedal, and it is possible to reliably convey information while preventing failure to recognize a warning.

If the driver receives this information with his foot, the pressing of his foot is preferably relaxed following an urging force in a direction of returning the accelerator pedal, and it is possible to prevent failures with respect to the judgment or operation and to reduce the overall response time.

In the case of a four wheeled vehicle, in addition to the above, a steering wheel is vibrated in a direction of the rotational axis using a vibrator or the like, and thus information is also conveyed to the driver's hands.

Also, in a vehicle such as a buggy, a throttle lever is provided close to a grip of the steering wheel so as to be operated using a thumb, but it is also possible to have such a structure that an urging force is caused to act on the throttle lever and vibrations are supplied.

If operating means that is operated by the driver's hands or feet controls drive assemblies of the vehicle, external force can be supplied to the operating means according to the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information device comprising:
    external force generating means for supplying external force for operating means touched by extremities of an operator during operation of a vehicle, said external force generating means supplies external force to a throttle grip of a vehicle with handlebars;
    judging means for receiving an external signal and judging traffic conditions; and
    control means for control driving of the external force generating means based on the judgement result of the judging means;
    said external force generating means comprises at least one of urging means for supplying an urging force to the throttle grip in a direction to reduce the number of engine revolutions and excitation means for supplying vibration to the throttle grip.

2. The information device according to claim 1, wherein the external force generating means supplies external force to an accelerator pedal of a four wheeled vehicle.

3. An information device for reducing the overall response time for an operation of a vehicle contingent upon traffic conditions comprising:
    a receiver for receiving a signal responsive to traffic conditions;
    a controller for receiving signals from the receiver and for producing an output dependent on traffic conditions;
    an operating means for controlling the operation of a vehicle, said operating means being touched by extremities of an operator during operation of a vehicle; and
    external force generating means for supplying an external force to the operating means touched by extremities of an operator during operation of a vehicle for providing a warning, said external force generating means supplies external force to a throttle grip of a vehicle with handlebars;
    whereby said output of said controller is supplied to said external force generating means for producing a warning to an operator of a vehicle depending on traffic conditions;
    said external force generating means comprises at least one of urging means for supplying an urging force to the throttle grip in a direction to reduce the number of engine revolutions and excitation means for supplying vibration to the throttle grip.

4. The information device according to claim 3, wherein the external force generating means supplies external force to an accelerator pedal of a four wheeled vehicle.

5. A method for reducing the overall response time for an operation of a vehicle contingent upon traffic conditions comprising the following steps:
    receiving a signal responsive to traffic conditions;
    providing a controller for receiving signals from the receiver and for producing an output dependent on traffic conditions;
    controlling the operation of a vehicle with operating means being touched by extremities of an operator during operation of a vehicle;
    supplying an external force to the operating means touched by extremities of an operator during the operation of a vehicle for providing a warning, said external force being supplied to a throttle grip of a vehicle with handlebars;
    whereby said output of said controller is supplied to said external force generating means for producing a warning to an operator of a vehicle depending on traffic conditions; and
    said supplying of an external force comprises at least one of urging means for supplying an urging force to the throttle grip in a direction to reduce the number of engine revolutions and excitation means for supplying vibration to the throttle grip.

6. The method for reducing the overall response time for an operation of a vehicle contingent upon traffic conditions according to claim 5, wherein the supplying of an external force supplies external force to an accelerator pedal of a four wheeled vehicle.

* * * * *